United States Patent [19]

Fiedler et al.

[11] 3,803,355

[45] Apr. 9, 1974

[54] APPARATUS FOR LINE SUPERVISION FOR WIRE BREAKS IN DATA TRANSMISSION SYSTEMS

[75] Inventors: Helmut Fiedler, Geretsried; Hans-Helmut Fiebig, Munich, both of Germany

[73] Assignee: Siemens Aktiengesellschaft, Berlin and Munich, Germany

[22] Filed: July 26, 1972

[21] Appl. No.: 275,411

[30] Foreign Application Priority Data

Aug. 3, 1971 Germany.............................. 2138819

[52] U.S. Cl. .................... 178/68, 178/58, 178/69 C, 178/69 G

[51] Int. Cl. .......................................... H041 15/00

[58] Field of Search ............ 178/68, 69 C, 69 G, 58; 179/170 C, 170 D, 170 F, 175.2 C; 325/2, 31, 67, 62–64, 363, 364

[56] References Cited

UNITED STATES PATENTS

| | | | |
|---|---|---|---|
| 3,029,420 | 4/1962 | Bagno et al. | 179/175.2 C |
| 3,582,788 | 6/1971 | Castagna | 325/62 |
| 3,172,959 | 3/1965 | Burns et al. | 179/170 D |

*Primary Examiner*—Albert J. Mayer

[57] ABSTRACT

Apparatus for monitoring data transmission lines for wire breaks in systems which utilize D.C. modulation is described. The transmitting and receiving devices in a subscriber station are equipped, respectively, with low and high internal impedances. The transmitter and receiver are connected in shunt with a bridge circuit to, respectively, different opposed pairs of junctions in the bridge circuit. The bridge includes a balancing network and the transmission line as ratio arms. A first voltage source may be connected in series with either the transmission line or in the shunt circuit containing the transmitter unit, and a second voltage source is connected in series with the balancing network. These voltage sources generate a monitoring current on the subscriber line upon the inverting of the polarities of the transmitter voltages in the two connected subscriber stations.

4 Claims, 5 Drawing Figures

| USa | USb | JL | $UE/_R$ |
|---|---|---|---|
| +U | +U | +I | $+I/2$ |
| +U | -U | 0 | $-I/2$ |
| -U | -U | -I | $-I/2$ |
| -U | +U | 0 | $+I/2$ |
| +U | / | 0 | $-I/2$ |
| -U | / | 0 | $+I/2$ |

| USa | USb | IL | $UE/_R$ |
|---|---|---|---|
| +U | +U | IW+ I | $+I/_2$ |
| +U | -U | IW | $-I/_2$ |
| -U | -U | IW - I | $-I/_2$ |
| -U | +U | IW | $+I/_2$ |
| +U | / | 0 | $-IW-I/_2$ |
| -U | / | 0 | $-IW+I/_2$ |

APPARATUS FOR LINE SUPERVISION FOR WIRE BREAKS IN DATA TRANSMISSION SYSTEMS

BACKGROUND OF THE INVENTION

This invention relates to an arrangement for monitoring transmission lines for wire breaks in data transmission systems which use D.C. modulation. In such systems the transmitting and receiving units of a subscriber's station, equipped, respectively, with low-impedance transmitter internal resistances and high-impedance receiver internal resistances, are connected in shunt with a bridge circuit having ratio arms composed of a balancing-network circuit, two bridge complementary resistances, and the transmission line.

A circuit arrangement is known for transmitting telegraph and data signals having any desired transmission rate (U.S. Pat. No. 3,573,370). The fundamental feature of this arrangement resides in the fact that the transmitter and the receiver of a terminal station are disposed in separate shunt circuits of a bridge circuit, whereby the ratio arms constituted by a transmission line and a first bridge complementary resistance are disposed in parallel with the transmitter, and a balancing-network circuit and a second bridge complementary resistance constitute the ratio arms in parallel with the receiver. In such an arrangement, the internal impedance of the transmitter, independently of the input impedance of the receiver, is extremely low relative to the bridge resistances.

This transmission arrangement is shown in FIG. 1. Two similarly constructed terminal stations, A and B are interconnected via a transmission line L. In both terminal stations, the balancing network, shown simply as a controllable resistance RN, and the two complementary resistances form, together with the loop circuit L, a bridge circuit. In a first shunt circuit across the bridge is connected a transmitter S, and in a second shunt circuit a receiver E. The transmitter S may, for example, be an electronic telegraph signal transmitter, which is modulated by the data to be transmitted SD. The receiver E is shown as an amplifier which receives and then transmits the received data ED to a subscriber's station (not shown herein), for example via a telegraph signal transmitter. According to the invention described in the aforementioned U.S. Patent, the internal impedance of the transmitter S must be very low so that it is possible to operate with low transmitting voltages. For this reason, the data transmission arrangement being described is, likewise, known as a D.C. data transmission system having a low transmitting voltage.

In this system, which possesses excellent transmitting properties, the monitoring of the transmission line for breaks poses a problem whenever transparency of the data transmission is required. In this context the term transparent means that the data transmission is neither bound to a given code nor to a given rate. The problem is best understood through reference to the table shown in FIG. 2, in which are plotted in a first column the transmitting voltage US*a* of the transmitter of terminal station A, in a second column the transmitting voltage US*b* of the transmitter of terminal station B, in a third column the conduction current IL flowing on the line, and in a fourth column the voltage across the input of receiver E of terminal station A or B. The voltage appearing across the transmitting output during a step signal of stop polarity or a step signal of start polarity is labeled +U or −U. If the resistance of the line is labeled Rh, then the current I coming from the circuit of FIG. 1 is computed in accordance with the following formula:

$$I = 2U/ (2R + RL)$$

It appears that, in operation, the conduction current IL can assume three values, viz. the value −I, the value O, or the value −I. The conduction current assumes the value O, whenever the transmitter voltages of the two terminal stations are opposed, with the line being cross-connected. However, the same effect is likewise achieved, if one or both cross-connected lines are interrupted. The result is that the data appear inverted in a mirror image fashion when a line break occurs in the receiver itself. Consequently, in these cases supervision can only take place via time weighting, but this results in the loss of transparency for the data transmission.

SUMMARY OF THE INVENTION

This invention provides a solution to this problem by providing at each terminal station a first voltage source connected into the line circuit and a second voltage source connected into the balancing-network circuit. These voltage sources generate a monitoring current flow on the subscriber's line with oppositely-poled transmission voltages.

The voltage sources provided by the invention may be dimensioned and aligned such that in the receiver of a terminal station, upon the occurrence of a line break, there always appears one or the other of a start-polarity or a stop-polarity. Thus, there exists an unmistakable indication of a line break.

BRIEF DESCRIPTION OF THE DRAWINGS

The principles of the invention will be most readily understood by reference to a description, given hereinbelow, of preferred embodiments constructed according to those principles in conjunction with the drawings wherein.

DETAILED DESCRIPTION OF THE DRAWINGS

Figures 1, 2:
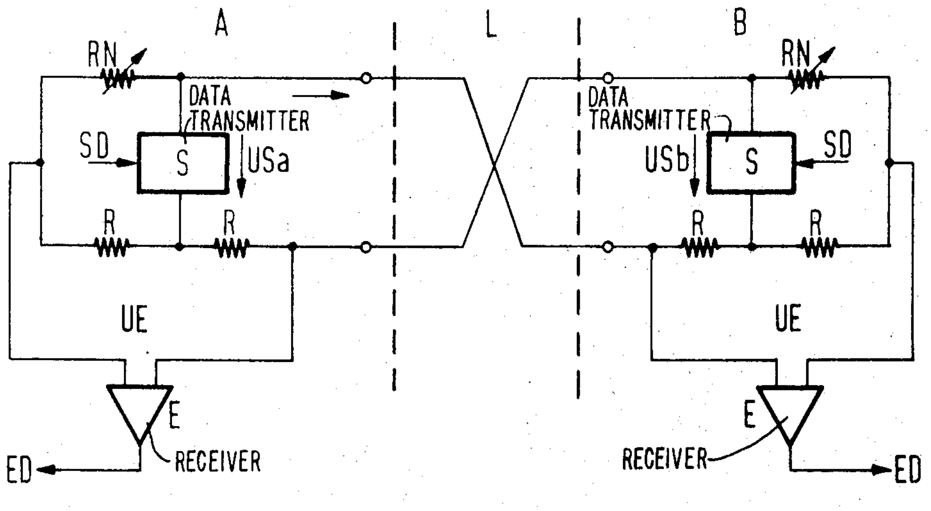
FIG. 1 is a schematic diagram of interconnected terminal stations of known construction.
FIG. 2 is a voltage chart illustrating the operating characteristics of the FIG. 1 circuit.
Figures 3, 4:
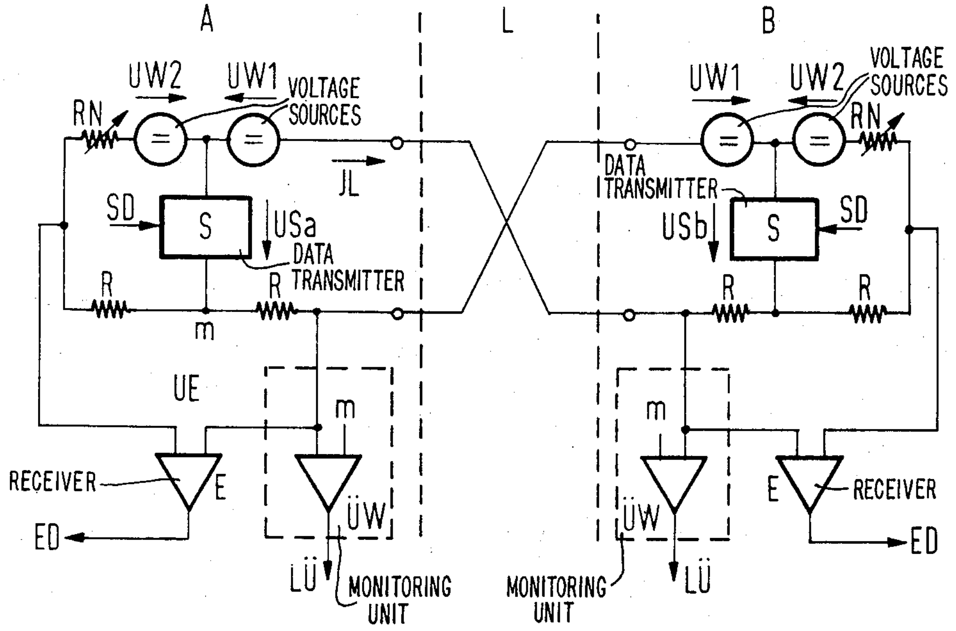
FIG. 3 is a schematic diagram of a first preferred embodiment of interconnected terminal stations constructed according to the invention.
FIG. 4 is a voltage chart illustrating the operating characteristics of the FIG. 3 circuit.

In the FIG. 3 embodiment the circuit components which are already included in the FIG. 1 embodiment are identified by the same reference symbols. Thus, each bridge circuit is composed of the balancing-network circuit RN and the two bridge complementary resistances R. The transmitting unit S is connected in shunt with two ratio arms of the bridge, and the receiving unit U is also connected in shunt with the bridge. The transmitting unit is modulated by the data transmitter SD, while the receiving unit receives and transmits for use, as desired, the data received ED. The two terminal stations A and B are interconnected via a line L.

Supplementary voltage sources disposed in the terminal stations are labeled UW1 and UW2. The voltage source UW1 is connected into the line circuit, and the voltage source UW2 is connected in the balancing-network circuit. Since the balancing conditions of the bridge circuit must not be changed as a result of the operation of the voltage sources, the voltage of the voltage source UW2 connected into the balancing-network circuit is twice as great as the voltage source UW1 connected in the line circuit.

As is apparent from the table shown in FIG. 4, the data transmission itself is not affected by the voltage sources. However upon occurrence of a line interruption, there is available a defined polarity in receiver E which is independent of the transmitter voltage US of the terminal station concerned. In the table the label US*a* again refers to the transmission voltage of the transmitter in terminal station A, the label US*b* refers to the transmitter voltage of the transmitter in terminal station B, and the label IL refers to the conduction current flowing on line L. In the last column is indicated the input voltage appearing at the receiver of a terminal station. If the resistance of line L is again labeled Rh the supplementary current IW flowing as the result of the operation of voltage sources UW1 and UW2 and superposed on the telegraph current is computed according to the formula:

$$Iw = 2\ Uw/2R + RL$$

It is now apparent that during a normal data transmission, the conduction current IL can again assume three values, viz. the value IW + I, the value IW, and the value IW - I. Contrary to the arrangement of FIG. 1, the conduction current IL in this case never assumes the zero value during the data transmission. Rather, this value occurs only in case of a line interruption, as specified in the bottom part of the table. The voltages available across the input of the receiver for these cases have assumed the values −IW−1/2 and −IW+1/2. It is apparent from these last two values that in case of a line interruption at the input of receiver E, a start polarity is made available, when ever the supervisory voltage UW is greater than half the maximum transmitter voltage U/2. By reversing the polarity of the voltage sources UW1 and UW2, the receiver can produce a stop polarity, whenever a line break occurs.

Figure 5:
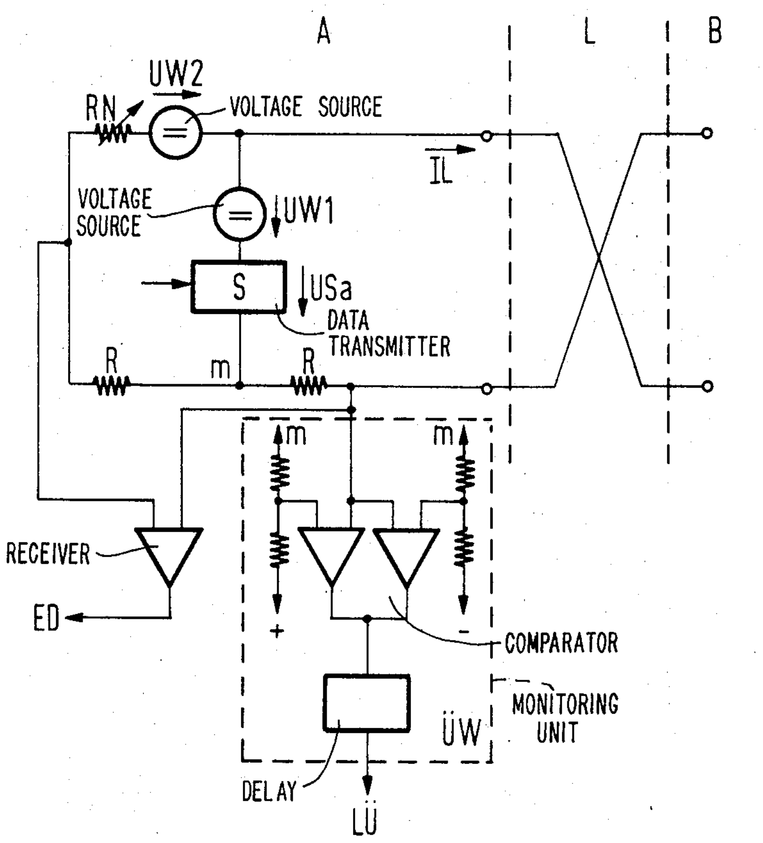
FIG. 5 is a schematic diagram of a second preferred embodiment of interconnected terminal stations constructed according to the invention.

In the embodiment of FIG. 5, the first voltage source UW1 is connected in series with transmitter S of a terminal station, in shunt with the bridge circuit. The circuit of FIG. 5 has the same function as the circuit of FIG. 3, with the advantage that both voltage sources are connected in tandem and of equal magnitude.

To signal a line break, the conduction current in the circuit in accordance with the invention is monitored. This can relatively easily be effected by connecting a monitoring unit ÜW to the incoming wire of a terminal station. The choice of a suitable monitoring unit is dependent on whether the conduction current IL runs through the zero value or not upon switching from the stop polarity to the start polarity or vice versa. In the event there is no running through the zero value, a simple threshold detector having a brief response time can be employed as a monitoring unit. This possibility is shown in FIG. 3. If the conduction current runs through the zero value, a "window discriminator," e.g. a double comparator having a delayed action, may be utilized. This possibility is shown in FIG. 5. Both of the aforementioned monitoring units are known and need not be described in detail herein.

The preferred embodiments described hereinabove are only exemplary of the principles of the invention. It is to be noted that modifications to or changes in these embodiments may be made within the scope of the invention as defined by the appended claims.

We claim:

1. In a direct current modulated data transmission system having subscriber stations equipped with transmitters and receivers and a bridge circuit, said subscriber stations being interconnected by at least a two wire transmission line, each said bridge circuit in each said subscriber station including line balancing means forming a ratio arm of said bridge circuit, said transmission line forming another ratio arm of said bridge circuit, said transmitter in each said subscriber station being connected between a first pair of opposed junctions in the said bridge circuit in each subscriber station, one of said first pair of opposed junctions being the connection point between an outgoing wire of said transmission line and said line balancing means, said receiver in said subscriber station being connected between a second pair of opposed junction points of the said bridge circuit therein, one of said second pair of junction points being the connection point of an incoming wire of said transmission line and said bridge circuit, apparatus for monitoring for wire breaks in said transmission line comprising:

first and second voltage source means in each subscriber station for generating a monitoring current in the said transmission line connecting at least two subscriber stations, said first and second voltage source means being connected in said bridge circuit as to produce said monitoring current upon an inversion of the polarities issuing from the transmitters in the connected subscriber stations, said first voltage source means being connected in said bridge circuit in series with the outgoing wire of said transmission line and said second voltage source means being connected in said bridge circuit in series with said line balancing means and monitoring means in each said subscriber station connected to an incoming wire of said transmission line for monitoring a conduction current produced in the normal operation of the subscriber station and for producing a monitoring signal upon failure of said conduction current.

2. The apparatus defined in claim 1 wherein said first voltage source is connected in series with said transmitter.

3. The apparatus defined in claim 2 wherein said monitoring means is a double comparator having delay.

4. The apparatus defined in claim 1 wherein said monitoring means is a threshold detector having a brief response time.

* * * * *